US011460902B2

(12) United States Patent
Grant et al.

(10) Patent No.: US 11,460,902 B2
(45) Date of Patent: Oct. 4, 2022

(54) ENERGY RECOVERY DURING SYSTEM SHUTDOWN

(71) Applicant: Cisco Technology, Inc., San Jose, CA (US)

(72) Inventors: Michael Robert Grant, San Jose, CA (US); Dean Ton Nguyen, San Jose, CA (US); Matthew Patrick Howard, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 119 days.

(21) Appl. No.: 16/677,775

(22) Filed: Nov. 8, 2019

(65) Prior Publication Data

US 2021/0141436 A1 May 13, 2021

(51) Int. Cl.
  *G06F 1/3206* (2019.01)
  *G06F 1/3234* (2019.01)
  *G06F 1/3287* (2019.01)
  *G05F 1/577* (2006.01)

(52) U.S. Cl.
  CPC .......... *G06F 1/3206* (2013.01); *G05F 1/577* (2013.01); *G06F 1/325* (2013.01); *G06F 1/3287* (2013.01)

(58) Field of Classification Search
  CPC .. H02M 2003/1552; H02M 1/12; H02M 1/42; H02M 1/4225; H02M 1/4233; H02M 1/4241; H02M 1/4258; H02M 1/425; H02M 1/4208
  USPC .......................... 323/205, 207, 222, 263, 289
  See application file for complete search history.

(56) References Cited

U.S. PATENT DOCUMENTS

| | | | |
|---|---|---|---|
| 6,754,091 B2 | 6/2004 | Reass et al. | |
| 6,775,160 B2 | 8/2004 | Siri | |
| 7,098,557 B2 * | 8/2006 | Swanson | H02M 3/158 |
| | | | 307/66 |
| 7,573,941 B2 | 8/2009 | Yang | |
| 7,734,432 B2 * | 6/2010 | Chuang | G06F 1/30 |
| | | | 702/58 |
| 7,746,877 B2 | 6/2010 | Trethewey | |
| 7,940,118 B1 | 5/2011 | Forghani-zadeh et al. | |

(Continued)

FOREIGN PATENT DOCUMENTS

EP 3009910 4/2016

OTHER PUBLICATIONS

Mu et al., "A dual-stage low-power converter driving for piezoelectric actuator applied in micro robot", International Journal of Advanced Robotic Systems, Jan.-Feb. 2019: 1-8, DOI: 10.1177/1729881419826849, 8 pages.

(Continued)

*Primary Examiner* — Bryan R Perez
(74) *Attorney, Agent, or Firm* — Edell, Shapiro & Finnan, LLC

(57) ABSTRACT

Presented herein are methodologies for providing power for last gasp operations of a circuit board when power is unexpectedly interrupted. A method includes monitoring a voltage of a main power supply; when the voltage of the main power supply falls below a predetermined threshold, disabling a first point of load (POL) converter that is being powered by the main power supply; boosting a voltage of an output capacitor of the first point of load converter to obtain a boosted voltage; and supplying the boosted voltage to an input of a second point of load converter.

20 Claims, 4 Drawing Sheets

(56) References Cited

U.S. PATENT DOCUMENTS

| | | |
|---|---|---|
| 8,134,347 B2 | 3/2012 | Lawson et al. |
| 8,247,924 B1* | 8/2012 | Zoller ............... H02J 9/061 |
| | | 307/80 |
| 8,497,605 B2 | 7/2013 | Kundur Subramaniyan et al. |
| 9,143,005 B1* | 9/2015 | Laird ................ G11C 5/141 |
| 9,857,859 B2 | 1/2018 | Morning-Smith et al. |
| 2012/0051097 A1* | 3/2012 | Zhang ............... H02M 3/158 |
| | | 363/21.07 |
| 2015/0381035 A1* | 12/2015 | Torres ............... H02M 3/16 |
| | | 327/536 |

OTHER PUBLICATIONS

Texas Instruments, "TIDA-00304—"Last Gasp" Hold Up Energy Storage Solution", Jul. 2012, 16 pages.

* cited by examiner

ENERGY RECOVERY DURING SYSTEM SHUTDOWN

TECHNICAL FIELD

The present disclosure generally relates to a power supply apparatus, and more specifically, to a power supply apparatus providing energy for dying or last gasp operations.

BACKGROUND

A system, such as a circuit board, may need "dying" or "last gasp" functionality that keeps at least portions of the system running for a set period of time after input power to the system has been unexpectedly disconnected. A last gasp or backup power circuit may be designed utilizing, e.g., a large capacitor bank for energy storage. The last gasp circuit obtains its power from power rails, which need to be kept at a minimum value for the last gasp circuit to operate properly for the desired period of time to perform housekeeping functions such as, e.g., storing system data for recovery on power up. Notably, when power is disconnected from the circuit board, non-last gasp circuitry will still burn backup power from the power rails, forcing a designer to size the backup capacitor bank large enough to account for these losses.

DESCRIPTION OF EXAMPLE EMBODIMENTS

Overview

Presented herein are methodologies for providing power for last gasp operations of a circuit board when power is unexpectedly interrupted. A method includes monitoring a voltage of a main power supply; when the voltage of the main power supply falls below a predetermined threshold, disabling a first point of load (POL) converter that is being powered by the main power supply; boosting a voltage of an output capacitor of the first point of load converter to obtain a boosted voltage; and supplying the boosted voltage to an input of a second point of load converter.

A device or apparatus is also described. The device, such as a circuit board, may include a voltage monitor configured to monitor a voltage of a main power supply of the circuit board, and when the voltage of the main power supply falls below a predetermined threshold, is further configured to disable a first point of load (POL) converter that is being powered by the main power supply; a voltage boost device, having an input connected to an output capacitor of the first point of load converter, configured to boost a voltage of the output capacitor of the first point of load converter and output a boosted voltage; and a voltage rail, arranged to receive the boosted voltage and supply the boosted voltage to an input of a second point of load converter.

Example Embodiments

Figure 1:
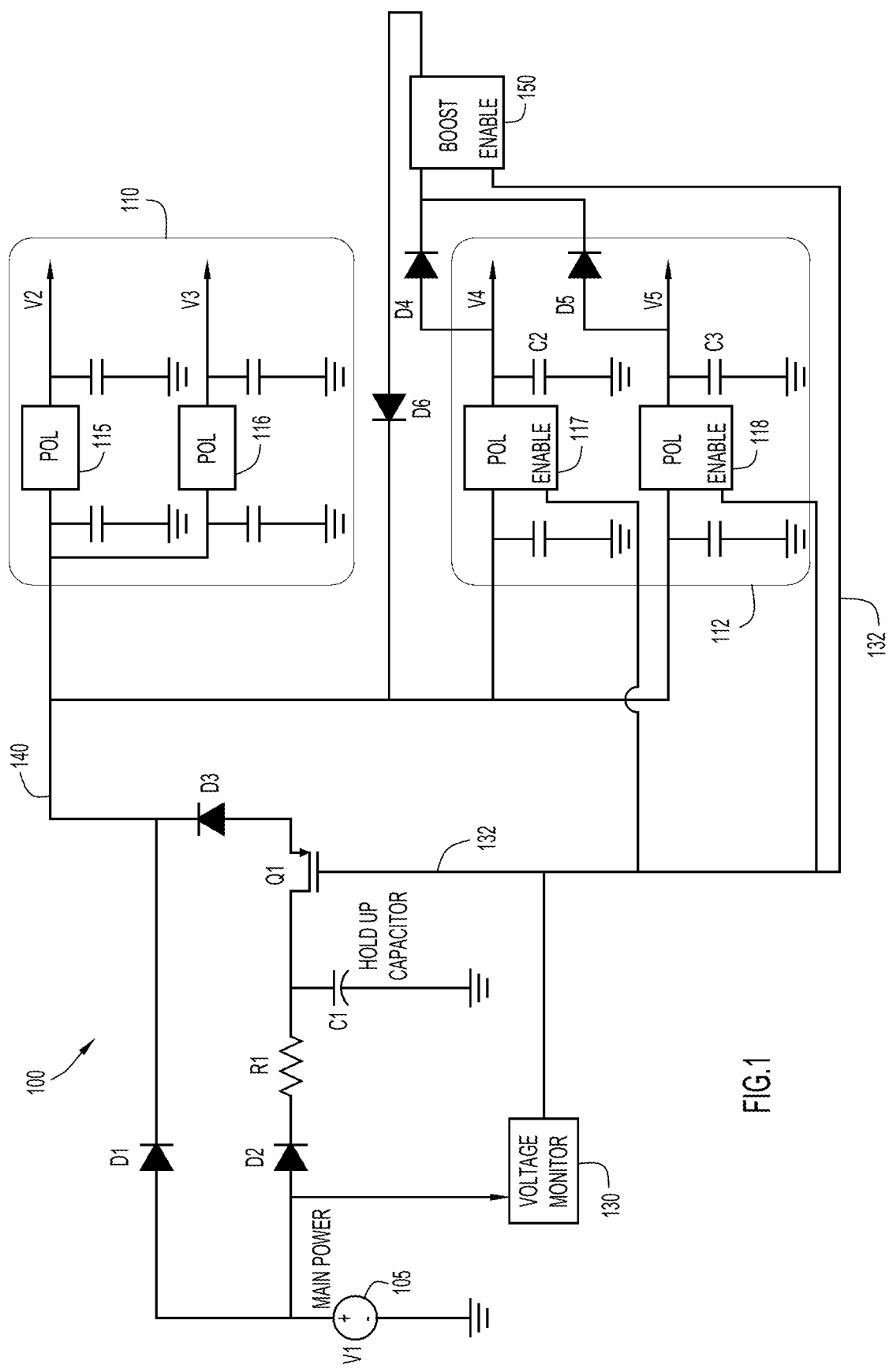
FIG. 1 is a schematic diagram of a first circuit in accordance with an example embodiment.

FIG. 1 is a schematic diagram of a first circuit 100 in accordance with an example embodiment. The first circuit 100, which may be incorporated onto a larger circuit board, includes a main power supply 105 that supplies power, via diode D1, to point of load (POL) converter group 110 and POL converter group 112. POL converter group 110 includes one or more point of load (POL) converters 115, 116, and POL converter group 112 includes one or more POL converters 117, 118. Each POL converter 115, 116, 117, 118 is connected to a voltage rail 140 and each generates a selected voltage V2, V3, V4, V5 that is used for circuitry (not shown) downstream from the respective POL converters 115, 116, 117, 118. Each POL converter 115, 116, 117, 118 is connected to a respective input capacitor (not expressly labelled with a reference numeral in the figure), and a respective output capacitor, shown, e.g., as C2 and C3 in POL converter group 112 (but not expressly labelled with reference numerals in POL converter group 110).

A voltage boost device 150 is connected, via diodes D4 and D5, to outputs of POL converters 117 and 118, respectively. An output of voltage boost device 150 is connected to voltage rail 140 via diode D6. Output capacitors, including C2 and C3, provide a filtering function and reduce ripple for voltages V2, V3, V4, V5 output by the respective POL converters 115, 116, 117, 118.

A voltage monitor 130 monitors a voltage V1 supplied by the main power supply 105. An output of voltage monitor 130 is connected via line 132 to a switch Q1, an enable input of POL converters 117, 118, and to an enable input of voltage boost device 150.

During normal operation, when main power supply 105 is delivering voltage V1 above a predetermined threshold, the main power supply 105 charges a holdup capacitor C1 via diode D2 and resistor R1. During this period, the output of voltage monitor 130 on line 132 keeps switch Q1 open, POL converters 117 and 118 operating (i.e., enabled) and voltage boost device 150 non-operating (disabled). That is, main power supply 105 powers POL converters 115, 116, 117, 118, which, in turn, provide desired voltages V1, V2, V3, V4.

It is possible, however, that main power supply 105 may fail or is unexpectedly turned off or disconnected. In such situations, sustained power will no longer be supplied to POL converters 115, 116, 117, 118, and the circuit board may be configured to trigger last gasp functionality. That is, certain systems may be designed to sustain a subset, or selected, operations after an input voltage source is removed in order to perform final operations before shutdown, e.g., recording system status at the time power was disconnected. Often, last gasp circuitry relies on a single, or bank of, dedicated hold up capacitors, such as C1 in FIG. 1, having sufficient energy to maintain a bus voltage on voltage rail 140 at a high enough voltage for some short period of time, e.g., on the order 5-100 ms. However, it can be expensive to include such dedicated capacitance to provide such an amount of power.

As noted, only selected operations of an overall circuit may be needed for last gasp operations. In the case of FIG. 1, assume that downstream circuits (not shown) of POL converter group 110 are "critical" for last gasp operations, and that downstream circuits (not shown) of POL converter group 112 are "not critical" for last gasp operations. As such POL converter group 110 may be deemed critical, and POL converter group 112 may be deemed non-critical. With that assumption, and in accordance with an example embodiment, energy stored in output capacitors C2, C3 can be recycled or harvested and supplied to voltage rail 140.

More specifically, when voltage V1 drops below the predetermined threshold, voltage monitor 130 changes its output (e.g., high to low, low to high) on line 132 such that Q1 is turned on, POL converters 117 and 118 are disabled (such that they are no longer sinking current from voltage rail 140), and voltage boost device 150 is turned on. Voltage boost device 150, such as a voltage converter, boosts a voltage level available from output capacitors C2 and C3 to a voltage that is usable on an input side of POL converters 115, 116. The voltage output by voltage boost device 150 is OR'd via diode D6 with voltage available from holdup capacitor C1 via diode D3.

Thus, as explained, and in accordance with an embodiment, non-critical POL converters, while not needed for final (last gasp) operations when main power is cut off, may nevertheless store non-negligible amounts of power in output capacitance. In a typical circuit, there are likely many capacitors in parallel whose energy can be tapped or harvested, as described herein. At the time of shutdown, such output capacitors are typically already charged up to their respective voltages and therefore contain readily available energy. In a typical system, these capacitors would slowly discharge through high-resistance elements and their energy would otherwise be dissipated as heat.

Instead of allowing that energy to discharge, and in accordance with an embodiment, the energy stored in the output capacitors of non-critical POL converters is harvested or recycled by using voltage boost device 150, or another power regulator or converter, which is configured to step up voltage, and convert the stored energy from the output capacitors (e.g., C2, C3) back to the input side of the critical POL converters (e.g., 115, 116).

In accordance with an embodiment, and as illustrated in FIG. 1, diodes D4 and D5 perform an "OR-ing" function, whereby a higher voltage of V4 or V5 will forward conduct through its respective diode. In this way, two or more different voltages can both feed into voltage boost device 150. This arrangement allows for a high number of non-critical POL converter output capacitors to be connected in parallel to feed voltage boost device 150. An output of voltage boost device 150 may be set to a voltage that is close to a desired voltage level of voltage rail 140 and can vary depending on the system bus voltage and downstream POL converter voltages. Diode D6 also provides an OR-ing function so that the output of voltage boost device 150 can feed energy alongside holdup capacitor C1 (which is OR'd through D3) and the main power input (OR'd through D1).

Figure 2:
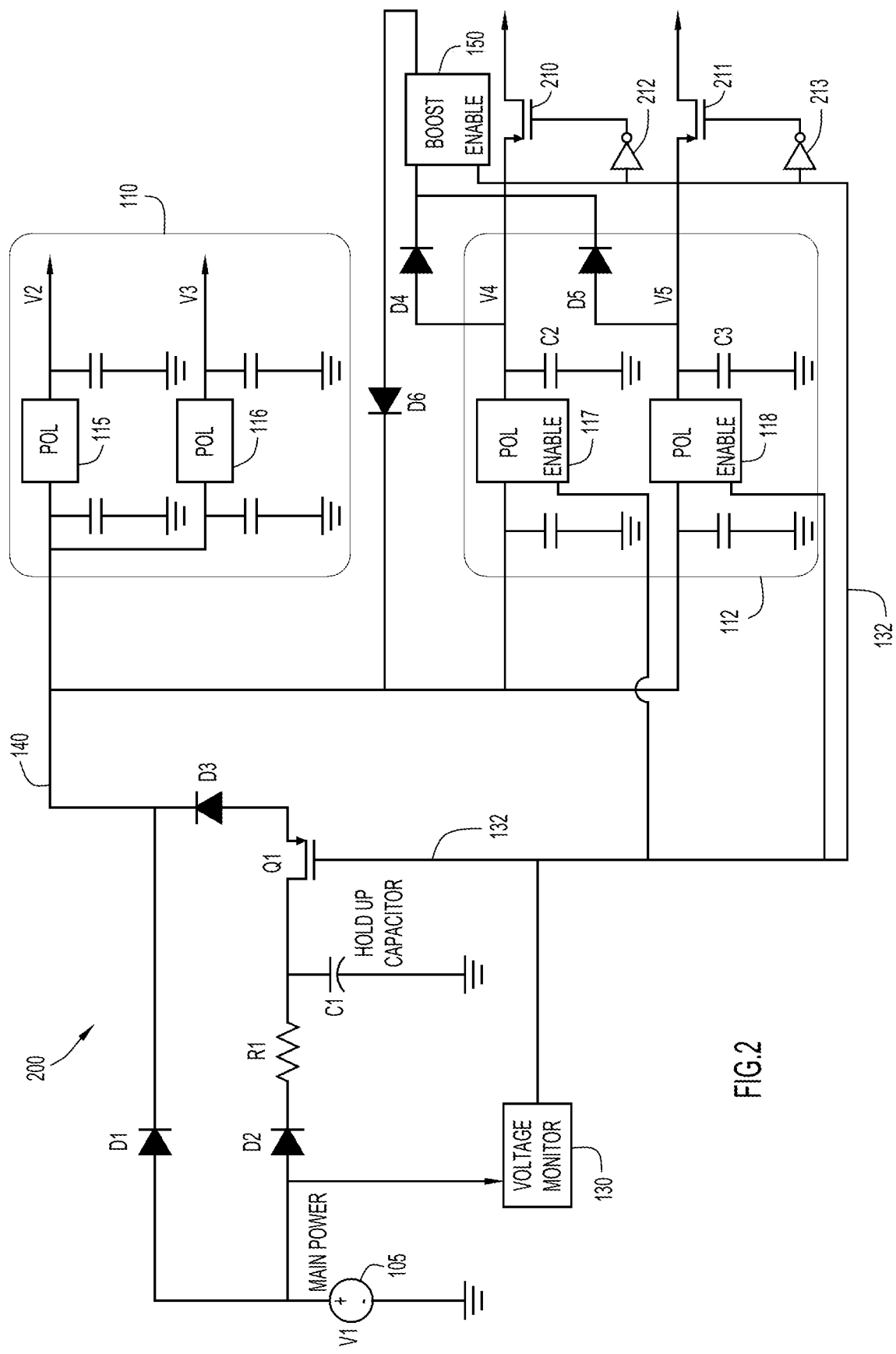
FIG. 2 is a schematic diagram of a second circuit in accordance with an example embodiment.

FIG. 2 is a schematic diagram of a second circuit in accordance with an example embodiment. Circuit 200 of FIG. 2 is substantially the same as first circuit 100 in FIG. 1, but includes switches 210, 211, which are controlled via inverters 212, 213 respectively, whose inputs are driven by line 132. In operation, when voltage V1 drops below the predetermined threshold, voltage monitor 130 changes its output (e.g., high to low, low to high) on line 132 such that Q1 is turned on, POL converters 117 and 118 are disabled (such that they are no longer sinking current from voltage rail 140), and voltage boost device 150 is turned on. Voltage boost device 150, such as a voltage converter, boosts a voltage level available from output capacitors C2 and C3 to a voltage that is usable on an input side of POL converters 115, 116 (part of POL converter group 110, which is critical for last gasp operations). The voltage output by voltage boost device 150 is OR'd via diode D6 with voltage available from holdup capacitor C1 via diode D3.

At the same time, the output (control signal) of voltage monitor is supplied to inverters 212, 213, which cause switches 210 and 211 to be turned off, thus fully disconnecting output capacitors C2 and C3 from their downstream circuits (not shown), and thus precluding such downstream circuits from bleeding off energy from output capacitors C2, C3 that is meant to be harvested for POL converter group 110 and its POL converters 115, 116.

Figure 3:
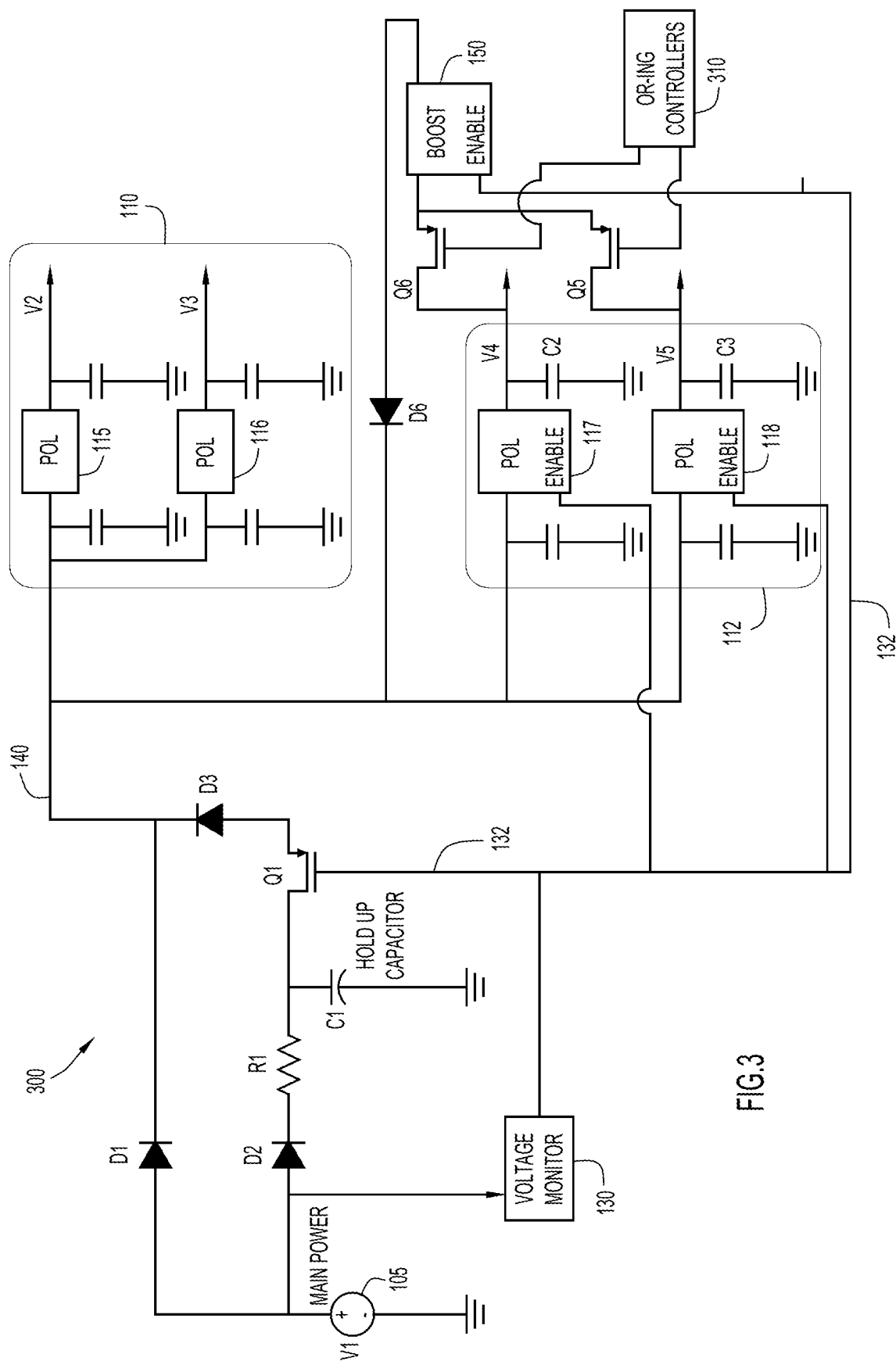
FIG. 3 is a schematic diagram of a third circuit in accordance with an example embodiment.

FIG. 3 is a schematic diagram of a third circuit in accordance with an example embodiment. Circuit 300 in FIG. 3 is also similar to first circuit 100 of FIG. 1, but instead of employing diodes D4 and D5 to perform the OR-ing function, diodes D4 and D5 are replaced with switches Q5 and Q6. Such an arrangement can reduce power loss from diode forward voltage drop. An OR-ing controller 310 is provided to drive respective gates of switches Q5 and Q6.

In yet another alternative embodiment, D6 may also be replaced by a switch, which can also be controlled by OR-ing controller 310 to ensure current flows from the converter to the bus with low loss. It is also noted that switches 210, 211 described in connection with FIG. 2 can also be employed with the embodiment of FIG. 3.

Those skilled in the art will appreciate that while only POL converters 115, 116, 117, and 118 are shown in the figures, there may be many more such POL converters on a given circuit board powered by a single main power supply, which could be susceptible to failure.

The premise of the embodiments described herein is that there is a non-trivial amount of energy stored in multiple POL converter output capacitors on a given circuit board that can be harvested.

For example, assume 3.3V, 1.8V, and 1.2V POL converters each with 2000 uF of output capacitance, which would typically go unused during a holdup (last gasp) period.

Given, $E = \frac{1}{2} CV^2$.

Then, $E = \frac{1}{2} * 2000 \ \mu F * 3.3^2 + \frac{1}{2} * 2000 \ \mu F * 1.8^2 + \frac{1}{2} * 2000 \ \mu F * 1.2^2$.

Thus, $E = 10,8900 \ \mu J + 3240 \ \mu J + 1440 \ \mu J = 15.57$ mJ

During the holdup condition, the circuit board will be in a low power mode. As a specific example, a grid endpoint module might require, e.g., 0.256 W during its power outage mode. 256 mW=256 mJ/S. If 100% of the energy in the capacitors were utilized, the added holdup time would be 15.57 mJ/0.275 W=56.6 ms.

The usable energy, however, may be reduced by two main factors: (1) input voltage limitations of the step-up converter from the holdup caps to the bus voltage, and (2) efficiency of the conversion from capacitors to the bus voltage, and then from the bus voltage to the required holdup voltage.

Regarding (1), step-up converters that operate down to low Vin, often intended for the energy harvesting market, allow operation to low hundreds of mV.

Furthermore, given that energy stored in capacitors is exponentially proportional to the voltage, there is disproportionately more energy stored at the higher voltages than at lower voltages. For example, given a capacitor charged to 1V, the energy stored from 250 mV to 1V is not 75% of the total stored energy—it is 93.75% of the stored energy ($1^2 - 0.25^2 = 0.9375$). Therefore, the loss of operating capability at very low voltages is not a major obstacle.

Regarding (2), the efficiency of these stages could vary depending on the design, but an average value might be 85% per stage. Suppose 90% energy usage of the output capacitors, and two stages of 85% efficiency. Then the total energy usage, obtained by multiplying the three efficiencies, is about 65%. So, in the example described above, the holdup time decreases from 56.6 ms to 36.8 ms.

Holdup time requirements vary widely from system to system, but a typical time may be on the order of 10's of ms. In practice, the energy stored in these output capacitors may not be enough on their own to achieve the holdup time, but they can reduce the energy requirement of a main/dedicated holdup capacitor and therefore reduce the size and cost of the same.

Figure 4:
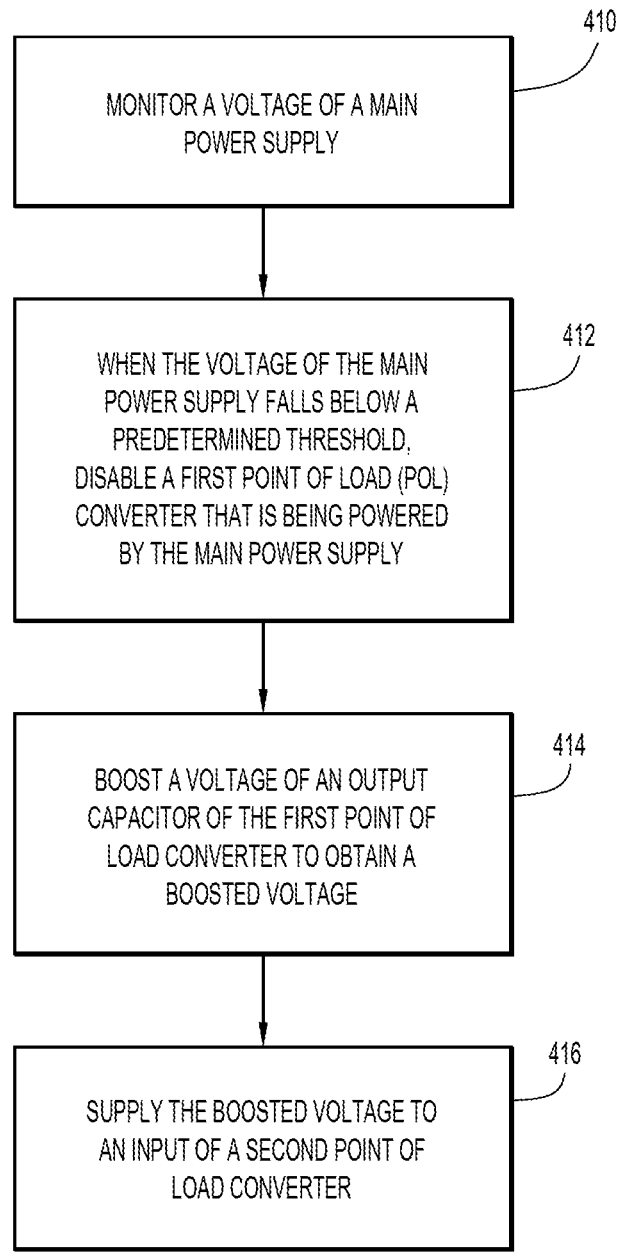
FIG. 4 is a flowchart illustrating a series of operations for harvesting energy stored in point of load output capacitors in accordance with an example embodiment.

FIG. 4 is a flowchart illustrating a series of operations for harvesting energy stored in point of load output capacitors in accordance with an example embodiment. At 410, a voltage monitor of a circuit board is configured to monitor a voltage of a main power supply. At 412, when the voltage of the main power supply falls below a predetermined threshold, the voltage monitor of the circuit board is configured to disable a first (non-critical) point of load (POL) converter that is being powered by the main power supply. At 414, the circuit board is configured to boost a voltage of an output capacitor of the first point of load converter to obtain a boosted voltage. And, at 416, the circuit board is configured to supply the boosted voltage to an input of a second (critical) point of load converter. Those skilled in the art will appreciate that although only a "first" and a "second" POL converter is referred to in the flowchart of FIG. 4, the output capacitors of multiple POL converters (e.g., those of POL converter group 112) can be tapped to harvest stored energy that is, in turn, used to power other multiple POL converters (e.g., those of POL converter group 110).

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In sum, and in one form, a method is provided. The method includes, monitoring a voltage of a main power supply; when the voltage of the main power supply falls below a predetermined threshold, disabling a first point of load (POL) converter that is being powered by the main power supply; boosting a voltage of an output capacitor of the first point of load converter to obtain a boosted voltage; and supplying the boosted voltage to an input of a second point of load converter.

In an embodiment, the method may further include combining the boosted voltage with a voltage provided by a holdup capacitor.

The method may also include charging the holdup capacitor from the main power supply while the main power supply is above the predetermined threshold.

The method may still further include supplying the voltage provided by the holdup capacitor to an input of the second point of load converter by turning on a switch using a control signal that is also used to disable the first point of load converter.

In one implementation, the method includes disconnecting the output capacitor of the first point of load converter from a load that the first point of load converter powers.

In another implementation, the method includes enabling a voltage boost device to generate the boosted voltage upon receipt of a control signal that is also used to disable the first point of load.

In one implementation, the method includes feeding the voltage of the output capacitor of the first point of load converter to the voltage boost device, via a diode.

In another implementation, the method includes feeding the voltage of the output capacitor of the first point of load converter to the voltage boost device, via a switch.

The method may further include controlling an operation of the switch with the control signal that is also used to disable the first point of load converter.

In an embodiment, the boosted voltage has a voltage value consistent with a voltage rail value supplied to the second point of load converter.

In another form, a device is provided. The device may include a voltage monitor configured to monitor a voltage of a main power supply of a circuit board, and when the voltage of the main power supply falls below a predetermined threshold, is further configured to disable a first point of load (POL) converter that is being powered by the main power supply; a voltage boost device, having an input connected to an output capacitor of the first point of load converter, configured to boost a voltage of the output capacitor of the first point of load converter and output a boosted voltage; and a voltage rail, arranged to receive the boosted voltage and supply the boosted voltage to an input of a second point of load converter.

The device may also include a holdup capacitor that is selectably connectable to the voltage rail.

In an embodiment, the holdup capacitor is charged while the main power supply is above the predetermined threshold.

The device may also include a switch via which the holdup capacitor that is selectably connectable to the voltage rail, wherein the switch is turned on using a control signal that is also used to disable the first point of load converter.

The device may still further include a switch that is arranged to disconnect the output capacitor of the first point of load converter from a load that the first point of load converter powers.

In an embodiment, the voltage boost device includes an enable input that receives a control signal that is also used to disable the first point of load converter.

In an embodiment, voltage of the output capacitor of the first point of load converter is provided to the voltage boost device, via a diode.

In another embodiment, voltage of the output capacitor of the first point of load is provided to the voltage boost device, via a switch.

In another form, a device is provided. The device includes a main power supply; a first point of load converter group and second point of load converter group, both connected to the main power supply, the first point of load converter group comprising a first point of load converter, and the second point of load converter group comprising a second point of load converter, wherein the first point of load converter comprises an output capacitor; a voltage boost device connected to the output capacitor of the first point of load converter; and a voltage monitor that monitors a voltage of the main power supply, and when the voltage of the main power supply falls below a predetermined threshold, the voltage monitor is configured to disable the first point of load converter and enable the voltage boost device such that a boosted voltage output by the voltage boot device is supplied to an input of the second point of load converter in the second POL converter group.

In an embodiment, the first point of load converter group is not critical during last gasp operations of the device, and the second point of load converter group is critical during the last gasp operations.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    monitoring a voltage of a main power supply that is supplied to a voltage rail of a circuit;
    when the voltage of the main power supply falls below a predetermined threshold, disabling a first point of load converter that is being powered by the main power supply;
    after disabling the first point of load converter, boosting a voltage of an output capacitor of the first point of load converter to obtain a boosted voltage, the output capacitor of the first point of load converter being disposed on an output side of the first point of load converter; and
    supplying the boosted voltage to the voltage rail of the circuit, which, in turn, supplies the boosted voltage to an input of a second point of load converter.

2. The method of claim 1, further comprising causing a voltage on the output capacitor of the first point of load converter to be supplied to a voltage boost device that generates the boosted voltage.

3. The method of claim 1, wherein the boosted voltage has a voltage value consistent with a voltage rail value supplied to the second point of load converter.

4. The method of claim 1, further comprising combining the boosted voltage with a voltage provided by a holdup capacitor.

5. The method of claim 4, further comprising charging the holdup capacitor from the main power supply while the main power supply is above the predetermined threshold.

6. The method of claim 4, further comprising supplying the voltage provided by the holdup capacitor to an input of the second point of load converter by turning on a switch using a control signal that is also used to disable the first point of load converter.

7. The method of claim 1, further comprising enabling a voltage boost device to generate the boosted voltage upon receipt of a control signal that is also used to disable the first point of load converter.

8. The method of claim 7, further comprising feeding the voltage of the output capacitor of the first point of load converter to the voltage boost device, via a diode.

9. The method of claim 7, further comprising feeding the voltage of the output capacitor of the first point of load converter to the voltage boost device, via a switch.

10. The method of claim 9, further comprising controlling an operation of the switch with the control signal that is also used to disable the first point of load converter.

11. A device, comprising:
    a voltage monitor configured to monitor a voltage of a main power supply of a circuit board, and when the voltage of the main power supply falls below a predetermined threshold, is further configured to disable a first point of load converter that is being powered by the main power supply;
    a voltage boost device, having an input connected to an output capacitor of the first point of load converter, configured to boost a voltage of the output capacitor of the first point of load converter and output a boosted voltage, the output capacitor of the first point of load converter being disposed on an output side of the first point of load converter; and
    a voltage rail, arranged to receive the boosted voltage and supply the boosted voltage to an input of a second point of load converter.

12. The device of claim 11, further comprising a holdup capacitor that is selectably connectable to the voltage rail.

13. The device of claim 12, wherein the holdup capacitor is charged while the main power supply is above the predetermined threshold.

14. The device of claim 12, further comprising a switch via which the holdup capacitor is selectably connectable to the voltage rail, wherein the switch is turned on using a control signal that is also used to disable the first point of load converter.

15. The device of claim 11, wherein the voltage boost device includes an enable input that receives a control signal that is also used to disable the first point of load converter.

16. The device of claim 15, wherein a voltage of the output capacitor of the first point of load converter is provided to the voltage boost device, via a diode.

17. The device of claim 15, wherein a voltage of the output capacitor of the first point of load converter is provided to the voltage boost device, via a switch.

18. The device of claim 11, further comprising a switch that is arranged to cause a voltage on the output capacitor of the first point of load converter to be supplied to a voltage boost device that generates the boosted voltage.

19. A device comprising:
    a main power supply;
    a first point of load converter group and second point of load converter group, both connected to the main power supply, the first point of load converter group comprising a first point of load converter, and the second point of load converter group comprising a second point of load converter, wherein the first point of load converter comprises an output capacitor on an output side of the first point of load converter;
    a voltage boost device connected to the output capacitor of the first point of load converter; and
    a voltage monitor that monitors a voltage of the main power supply, and when the voltage of the main power supply falls below a predetermined threshold, the voltage monitor is configured to disable the first point of load converter and enable the voltage boost device such that a boosted voltage output by the voltage boost device is supplied to an input of the second point of load converter of the second point of load converter group.

20. The device of claim 19, wherein the first point of load converter group is not critical during last gasp operations of the device, and the second point of load converter group is critical during last gasp operations.

* * * * *